Dec. 9, 1958 J. E. HILL ET AL 2,863,996

TELEVISION PROGRAM SELECTOR

Filed March 28, 1955 5 Sheets-Sheet 1

INVENTORS
JAMES E. HILL AND
GUY M. FARRELL
BY
Mason, Kolehmainen, Rathburn & Wyss
ATTORNEYS Dec. 9, 1958 J. E. HILL ET AL 2,863,996

TELEVISION PROGRAM SELECTOR

Filed March 28, 1955 5 Sheets-Sheet 2

INVENTORS
JAMES E. HILL AND
GUY M. FARRELL

BY Mason, Kolehmainen, Rathburn & Wyss
ATTORNEYS

TELEVISION PROGRAM SELECTOR

INVENTORS
JAMES E. HILL AND
GUY M. FARRELL
BY
Mason, Kolehmainen, Rathburn & Wyss
ATTORNEYS Dec. 9, 1958 J. E. HILL ET AL 2,863,996

TELEVISION PROGRAM SELECTOR

Filed March 28, 1955 5 Sheets-Sheet 4

INVENTORS
JAMES E. HILL AND
GUY M. FARRELL
BY
Mason, Kolehmainen, Rathburn & Wyss
ATTORNEYS Dec. 9, 1958 J. E. HILL ET AL 2,863,996

TELEVISION PROGRAM SELECTOR

Filed March 28, 1955 5 Sheets-Sheet 5

INVENTORS
JAMES E. HILL AND
BY GUY M. FARRELL

Mason, Kolehmainen, Rathburn & Wyss
ATTORNEYS

United States Patent Office 2,863,996

Patented Dec. 9, 1958

2,863,996

TELEVISION PROGRAM SELECTOR

James E. Hill, Oaklawn, and Guy M. Farrell, Lincolnwood, Ill.

Application March 28, 1955, Serial No. 497,226

7 Claims. (Cl. 250—20)

The present invention relates to television program selectors, particularly to program selectors of the type which enable the preselection of a plurality of channels, and, consequently, programs to be viewed during particular future time intervals so that thereafter a television receiver is automatically adjusted to reproduce the programs selected without further adjustment of the receiver, and has for a principal object the provision of a new and improved television program selector of this type which is easy to operate, is contained within a relatively small housing, is attractive in appearance, and which, while enabling accurate and reliable television program selections, may be manufactured at a relatively low cost and, therefore, may be competitively marketed.

Since most metropolitan areas in the United States are serviced by three or more television stations, it is unlikely that any one viewer or group of viewers, who watch the same television receiver, will at most times be desirous of watching programs which are successively televised in the same television channel. Consequently, during a single continuous period of television entertainment, it becomes necessary at frequent periods, probably not less than every fifteen minutes, for one of the viewers to remove himself from his viewing station and go to the television receiver to switch the tuner to another channel or possibly to switch off the receiver. This constant getting up and down is, of course, undesirable.

Furthermore, there are many situations where it is desirable if not altogether necessary for someone other than the viewers to make the channel selections. For example, in hospitals, homes for the aged, etc. out of a number of persons who may use a single television receiver there may be none who are able to operate it properly so that an attendant who has other more important duties has to be available at frequent intervals to make the channel selections. Also, parents who endeavor to control the viewing habits of their children must be available for making frequent channel selections and for completely shutting off the receiver when necessary.

For these and many other reasons such as relieving the viewer from the necessity of frequently referring to the television program listings, for relieving him from having to remember to turn the set on at particular times and for facilitating the use of a television receiver as a means for awakening him with his favorite television program, it is desirable that an inexpensive and reliable device be provided for enabling the viewer to select a number of television programs for future viewing and for thereafter automatically operating the receiver so as to reproduce these programs. Various devices which facilitate switching from one channel to another during periods of television entertainment, have been taught by the prior art, but such devices are relatively expensive to manufacture and frequently are not reliable in operation.

Another object of the present invention is, therefore, to provide a new and improved television program selector with which the television viewers, or others, may preselect a schedule of viewing entertainment so that the television receiver is thereafter automatically switched from channel to channel at the proper times, thus enabling the viewers to view the selected programs without any further adjustment of the controls of the television receiver.

Another object of the present invention is, therefore, to provide a new and improved apparatus which enables the preselection of a plurality of television programs before the commencement of the period of television viewing entertainment.

Still another object of the present invention is to provide a new and improved television program selector which may be used to accurately and reliably switch at a future time or times the tuner of a television receiver to various channels in a predetermined manner.

A further object of the invention is to provide a television program selector which includes on the face thereof a clock such that in addition to enabling the preselection of television programs, the selector apparatus may be used as a conventional timepiece.

A still further object of the present invention is to provide a television program selector wherein the selector may be quickly and easily cleared of previous selections.

A further object of the present invention is to provide a new and improved television program selector wherein the selections may be quickly established and in which adjustment of the selector need only be made for those instances at which it is desired to change the channel to be viewed.

A still further object of the present invention is to provide a new and improved television program selector which is relatively compact and which may be readily and accurately attached to conventional receivers with a minimum of time, effort, and expense.

A still further object of the present invention is to provide a new and improved television program selector wherein the selections may be easily and accurately made with a minimum chance of error in the selection.

A still further object of the present invention is to provide a controlled tuner driving means which is compact in design, which may be economically manufactured and which may be attached to a conventional television receiver for positioning the rotatable tuning member of the receiver in selected positions in accordance with signals supplied thereto.

A still further object of the present invention is to provide a television program selector which, being attractive in appearance, may be mounted in full view for association and cooperation with a television receiver.

Briefly, the television program selector of the present invention comprises a memory mechanism on which the program selections are recorded, and a clock motor for driving the memory mechanism with respect to a selector switch for periodically supplying channel switching signals to a tuner drive motor for positioning the channel selector of a television receiver. In order to facilitate the introduction of program selection information into the memory mechanism, a finger dial operated cam member records the channels selected, and a rotatable knob which is operatively connected with the memory mechanism is employed to correlate the channels selected with the time at which it is desired that such channels be tuned in. The program selector of this invention also includes a button actuated erasure device for clearing the memory mechanism of program selection information and a clock face to enable the selector device to indicate the time of day.

The television program selector of the present invention, therefore, enables the person making the selection to accurately dial in the channel while simultaneously positioning the time selector mechanism, whereby there is little chance that an incorrect channel will be selected. This feature is, of course, especially important where the party making the selection is doing so for others who are unable to make the selections for themselves. Furthermore, since those people such as nurses, who make the selections for others, generally have additional activities requiring their attention, it is important that the selections be made in as short a time as possible. In accordance with one important aspect of the invention, the set-up time is minimized because selections need only be put into the program selector at those times when the channel should be changed or the receiver should be turned on or off. In regard to this same requirement, it is also most important that means be provided for quickly clearing the television program selector of past selections so that a new set-up may be made. In accordance with the present invention, a roller and manually actuated finger button are provided whereby a mere depression of the button and rotation of the time selector mechanism automatically and quickly clears the device of previous selections.

In accordance with another aspect of the invention, the time during which the set-up is made is minimized by the use of a selector switch which only transmits a signal to the tuner drive motor when the channel is to be changed. Because of this feature, the person making the selections need only introduce information into the program selector for those instances at which he wants the channel to be changed or the receiver to be turned on or off. When, therefore, the same channel is to be received for a number of hours, such, for example, as when an opera, symphony, or ball-game are to be received, only a single selection need be made. When the same channel is to be observed for a long period of time certain prior art program selectors require that a large number of selections be made with the inherent increased chance of error and time required to initially set up the apparatus.

Another important feature of the present invention resides in the tuner drive mechanism which may be quickly and easily attached to the tuning shaft of a conventional television receiver which, in some present day models extends rearwardly from the back of the receiver cabinet. This improved drive mechanism is responsive to signals supplied thereto along a single, small diameter flexible conductive cable which extends from the back of the television program selector.

Further objects and advantages and a better understanding of the present invention may be had from the following description and the accompanying drawings, in which.

Figure 1:
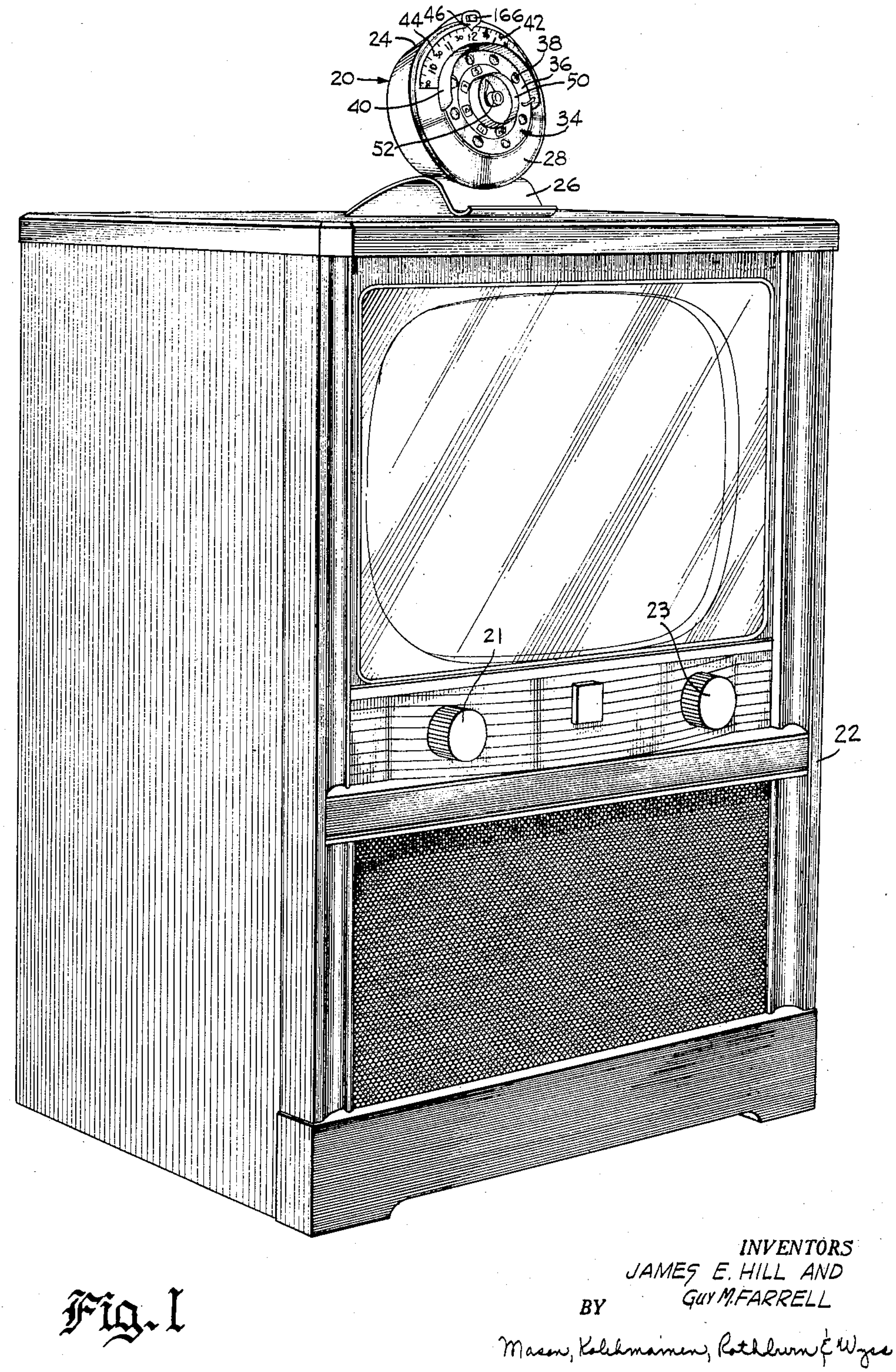
Fig. 1 is a perspective view of the television program selector of the present invention as operatively employed in conjunction with a conventional television receiver.

Referring now to the drawings and particularly to Fig. 1 where is shown a television program selector 20 supported on the top of the cabinet of a conventional television receiver 22. Although the television program selector 20 is illustrated as being supported by the television receiver, it will be understood that since the selector 20 is in no way physically secured or mechanically connected to the receiver 22, it may be positioned in any other desirable location which may, in fact, be at a place considerably remote from the actual place at which the television receiver 22 is located. However, in most instances for convenience of the user it is desirable that the selector be located in close proximity to the receiver 22 with which it is associated, and since the selector 20 is attractive in appearance, it is generally positioned on the top of the television receiver cabinet. As shown, no attachments need be made at the front of the receiver cabinet so as to detract from the inherent beauty of the receiver cabinet as a piece of furniture which may be displayed wherever desired. The face of the program selector 20 is generally symmetrical not having a multiplicity of visible pins or other movable or adjustable parts to mar the appearance of the selector casing or that of the television receiver with which it is employed.

Furthermore, the usual receiver controls such as the on-off and volume control knob 21 and the channel selector knob 23 may be used irrespective of the fact that the program selector 20 is available for the making of future selections. Consequently, when the program selector 20 is not in use, the television receiver 22 may be operated in the normal manner. Since the operation of conventional television receivers is well known, for purposes of clarity the details of the receiver 22 are not discussed herein, but it may be well to point out before describing in detail the mechanism of the program selector 20 that the tuner of a television receiver is used to select the particular television channel which contains that signal which is representative of the program reproduced by the receiver. Since the majority of television tuners utilize a rotatable shaft for the selection of individual ones of tuned circuits so as to enable the receiver to reproduce the image represented by the televised signal contained in the selected channel, the program selector of the present invention has certain portions thereof which are particularly applicable for use with such tuners. It should be understood, however, that the principal features of this invention are equally applicable to tuners other than the rotatable shaft type, such, for example, as those in which an operating member is moved to one of a plurality of selectable positions along a longitudinal guide path to select individual ones of the tuned circuits or to change the resonant frequency of a single tuned circuit.

In a preferred embodiment of this invention, the selector 20 generally comprises a cylindrical casing 24 appropriately constructed of sheet metal or molded of plastic which is mounted on a support stand 26. Conveniently, the stand 26 is a metal sheet formed with a reverse band intermediate the ends thereof. Since in most instances the television program selector 20 is supported below the eye level of the person making the setup, to facilitate a use of the program selector 20 it is desirable that the face of the instrument be pointed or directed towards the eyes of the person doing the selecting and, therefore, the casing 24 is so supported on the stand 26 that it is tilted from the vertical plane with the face thereof pointing slightly upward.

The television program selector 20 further includes a generally dished, circular front cover member 28 which, having a diameter exceeding that of the housing 24, overhangs the cylindrical housing 24 so as to provide an outwardly extending annular flange 28*a*. This flange is, of course, unnecessary from an operational viewpoint but is provided because it adds to the beauty of the design and assists in rigidly attaching the housing 24 to the support stand 26 or other support means.

An annular forwardly directed ridge 30 in the cover 28 defines a circular central cavity 32 which faces the front of the selector and in which is mounted the channel selecting mechanism 34 to be more fully described hereinafter. The mechanism 34 by which the particular channels to be viewed are selected, comprises an annular, disk-like rotatably mounted member 36 provided with a plurality of equally spaced apertures 38 which are adapted to receive the finger of the person making the selections and which enable the disk 36 to be manually rotated to a desired position about the principal axis thereof.

The television program selector 20 also includes a semi-circular forwardly extending shield 40 which is attached to the cover 28 along the upper portion of the annular ridge 30. A semi-circular aperture 42 is provided in the upper half of the cover 28 intermediate the ridge 30 and the outer periphery of the cover 28 so as to provide a window through which may be viewed a substantial portion of a rotatable annular member 44 on which is provided time graduations for cooperation with a time indexing pointer member 46, located at the top center of the outer periphery of the cover 28, so as to effect a time indicating device which in addition to being useful in making program selections is also useful as a clock.

The time graduated dial, which as hereinafter described, makes one revolution during each twelve hour period, has the numerals imprinted thereon, the numbers increasing in a clockwise direction. Since the average person is used to seeing the numerals on a clock face increasing in a clockwise direction, it is important that the numerals be so printed on the disk 44. Therefore, the drive mechanism for the disk 44 is adapted to rotate the disk 44 in a counter-clockwise direction.

In order to facilitate the accurate synchronizing of the program selector 20 with the time of day, there is provided a conventional minute indicating hand 52 which is visible from the front of the selector 20 and which rotates in a clockwise direction at the usual rate of one revolution per hour. The channel selector dialing disk 36 is provided with a centrally located recess 48 in which is supported a time selector knob 50 having an annular ring portion 49 defining a recess in which is disposed the minute indicating hand 52.

To assist a person in accurately setting the timing mechanism of the selector 20 in synchronism with the time of day, it is necessary that some means be provided to facilitate a reading of the exact relative position of the minute hand 52. Since, as is hereinafter described in detail, the knob 50 is rotated through 360° once during each twelve-hour period it is not convenient to provide such an index on the knob 50, but since the disk 36 is always returned to the same position after dialing, it is convenient to provide a plurality of equally spaced graduations 53 directly on that portion of the disk 36 which is directly behind the knob 50 and to form the time selector knob 50 of a transparent material such, for example, as methyl methacrylate polymer, which is relatively inexpensive. The graduations 53 thus provide a background over which the minute hand 52 travels, simplifying an estimation of its relative position. To set the selector 20 to the time of day, the minute hand 52 is manually rotated which rotates the dial 44 through the clock mechanism to be described hereafter.

Figures 2, 15:
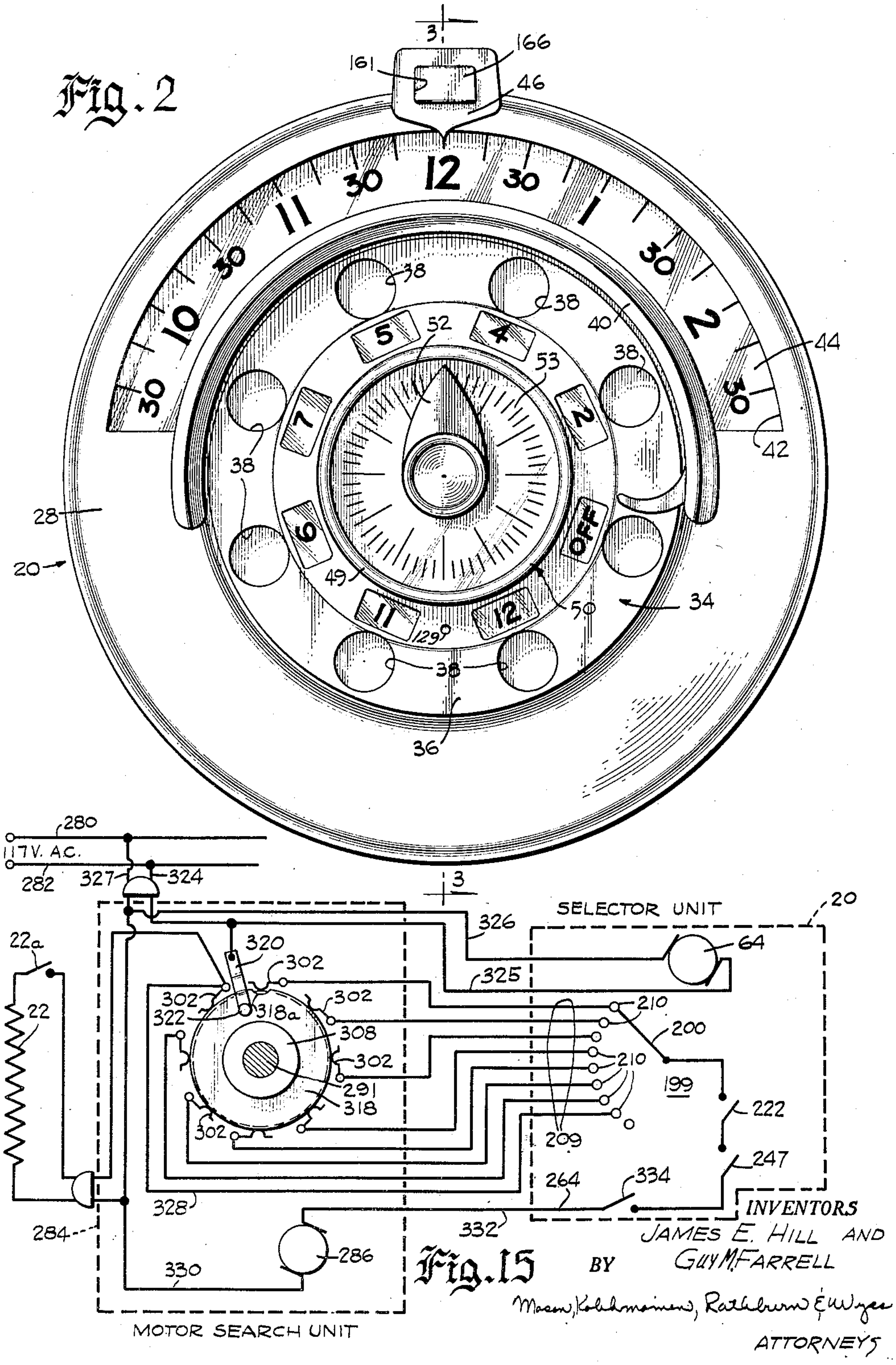
Fig. 2 is a front elevation view of the television program selection mechanism of the present invention.
Fig. 15 is a schematic diagram of the electric circuit of the present invention.
Figures 3, 6, 7:
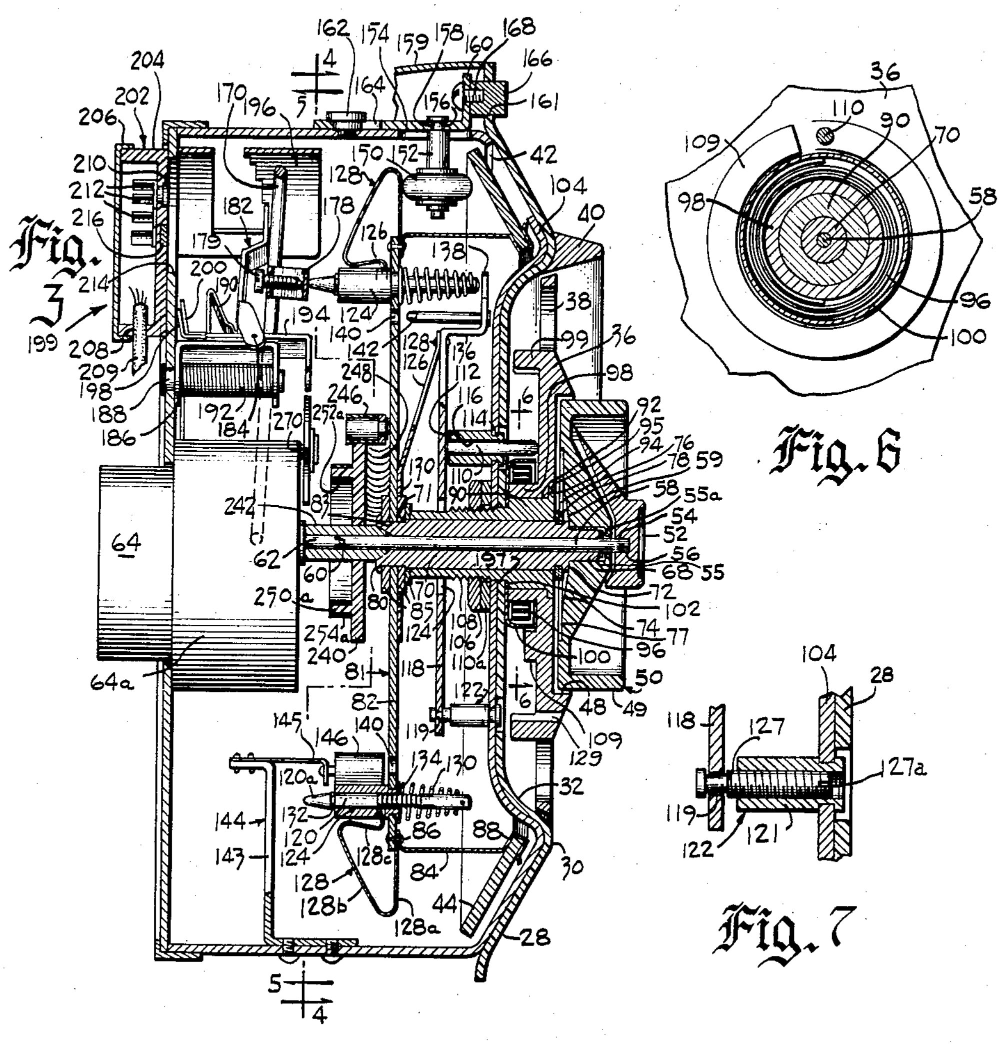
Fig. 3 is a cross-sectional view of the mechanism of Fig. 2 showing the major operating portions thereof and taken along the line 3—3 thereof.
Fig. 6 is a sectional view of the apparatus of Fig. 3 looking forward along the line 6—6 thereof, assuming that all of the apparatus is shown therein.
Fig. 7 is an enlarged, fragmentary, sectional view of a certain adjusting mechanism used in the selector shown in Fig. 2.
Figures 4, 12, 13, 14:
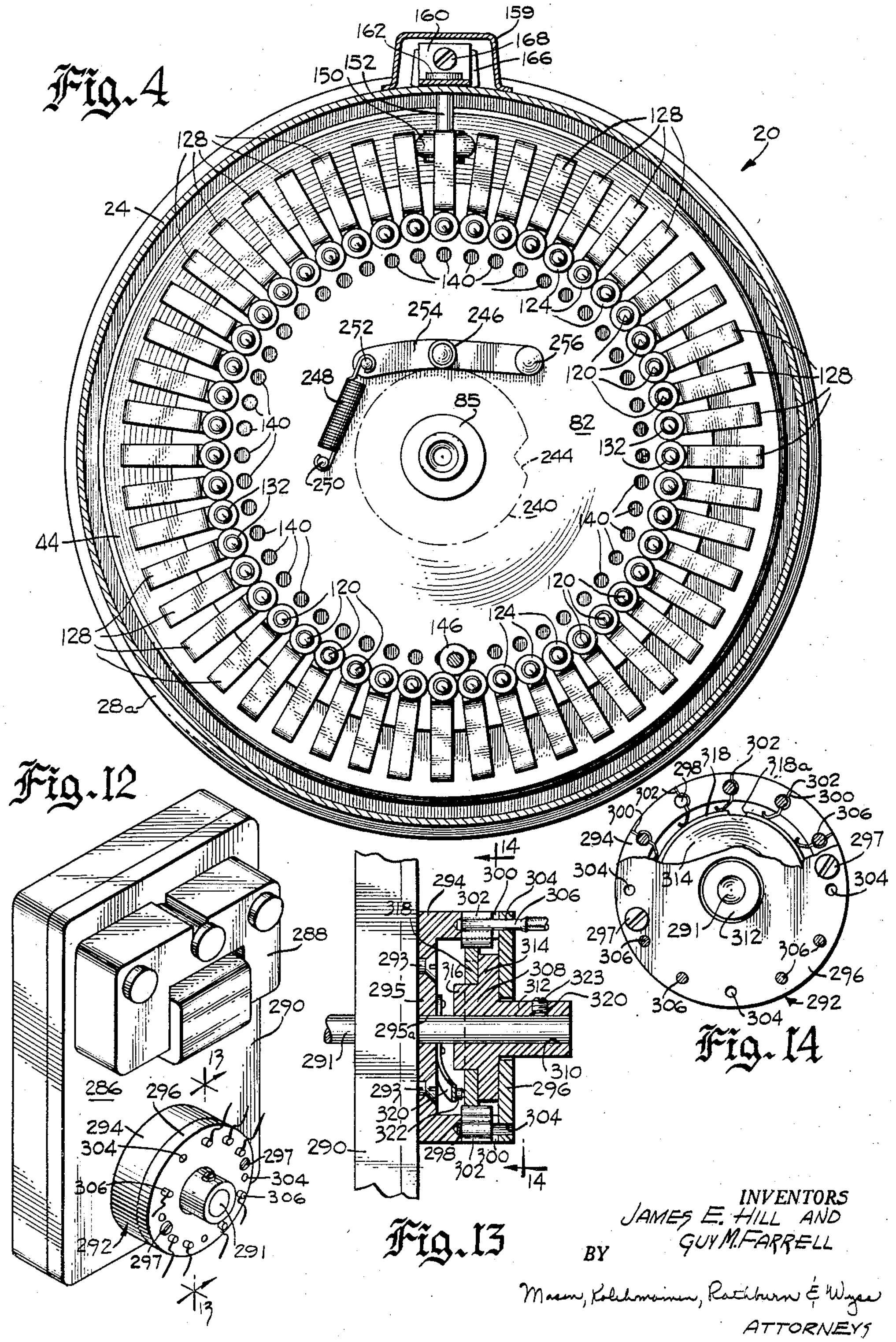
Fig. 4 is a sectional view of the apparatus of Fig. 3 looking forward along the line 4—4 thereof, assuming that all of the apparatus is shown therein.
Fig. 12 is a perspective view of the tuner drive and search mechanism of the present invention.
Fig. 13 is a sectional view of the switching portion of the apparatus of Fig. 12.
Fig. 14 is a partial section view of the switching apparatus of Fig. 13 taken along the line 14—14 thereof, assuming the entire switch is shown therein.

Referring now more particularly to Figs. 2, 3 and 4, the minute hand 52 is provided with a centrally located rearwardly directed recess 54 which is adapted to mate with the knurled end 56 of a coupling shaft 58 which in turn is coupled at its rearward end 60 to the minute shaft 62 of a clock motor and timing gear mechanism 64. The mechanism 64 is substantially conventional in that the minute shaft 62 makes one complete 360° revolution every hour whereby the relative position of the minute hand 52 with respect to the casing cover 28 and, consequently, the graduations 53 is indicative of the fraction of the instant hour which has passed.

The time selector knob 50 is provided along the longitudinal axis thereof with an aperture 54 to freely accommodate the forward end of the shaft 58 and is also provided with an enlarged circular recess 59 which meets the aperture 55 at a shoulder 55*a* thereby to accommodate and retain the minute hand 52. The shaft 70 is provided with a central aperture through which the minute shaft 58 extends such that the shafts 58 and 70 are both concentric and mutually exclusive. The aperture in the shaft 70, being only slightly larger than the outer diameter of the minute shaft 58, provides a forward longitudinal bearing support for the shaft 58 in close proximity to the minute hand 52, thereby to maintain the hand 52 in register with the graduations 53 and to insure that the indexing portion of the hand 52 does not contact the flange 49.

In order to secure the time selecting knob 50 at a fixed position on the shaft 70 and to insure that it does not interfere with the freedom of rotation of the dialing mechanism 34, an outwardly directed annular shoulder 72 is provided near the forward end of the shaft 70 in abutment with the knob 50. The central portion of the back of the knob 50 is dished out to effect a circular recess 74, and the forward end of the shaft 70 has a flat surface to key and retain the knob 50 when it is pushed onto the shaft 70. An annular groove 78 is machined in the shaft 70 just rearward of the shoulder 72 so as to coact with a C-washer 76 to removably lock the shaft 70 into the sleeve bushing 90 at a fixed position along the principal axis thereof.

In order to enable the rotation of the time dial 44 by means of the time selector knob 50 so as to perform the time selection portion of the entire program selection, the dial 44 is attached to, for rotation with, the memory apparatus 81 which includes a selector disk 82 attached at its center to the shaft 70. Specifically, the graduated time dial 44 is attached to the disk 82 by means of a plurality of spaced resilient brackets 84 which are attached to the periphery of the selector disk 82 by means of respective rivets 86 and to the dial 44 by means of a stamped reverse bend 88 which is adapted to engage the inner portion of the dial 44. Because the brackets 84 are constructed of resilient material and because the recess formed by the reverse bend 88 is narrower than the thickness of the dial 44, when the dial 44 is snapped into these recesses, a firm friction grip therefor results and rotation of the selector disk 82 results in a corresponding rotation of the dial 44. The disk 82 has a central aperture 83 which is adapted to be received in an annular recess 71 in the shaft near the rearward end thereof so that the disk 82 is fixedly secured to the shaft 70. To insure a rigid bond between the shaft 70 and the disk 82, a plurality of washers 85 are sandwiched between the disk 82 and the radial walls of the recess 71 in the shaft 70. In this way the angular position of the time dial 44 is accurately correlated with the angular position of the selector disk 82 and the actual angular position of both of these members is adjustable by means of the time selector knob 50 through the shaft 70, In order to permit freedom of rotation of the dial mechanism 34 with respect to the control knob 50 and the shaft 70, a sleeve bushing 90 having a central aperture closely fitted over the shaft 70 is adapted to provide a support bearing for the shaft 70. In addition, bushing 90 is provided with an outer bearing surface 92 having a forwardly positioned annular flange 94 which is adapted to be received in a mating, centrally located aperture 95 in the disk 36. The disk 36 is thus freely rotatable about the bearing 90 and is supported thereby.

In order to physically support the forward portion of the shafts 70 and 58 and their associated parts, the cover 28 has a central aperture 97 which provides a rigid support for the sleeve bearing 90.

So as to restore the dial 36 to a neutral position after each channel selection is made, a spiral spring 96 is attached at its inner end to the rearwardly directed annular flange 98 of the dial disk 36 and attached at its outer end to a cup-like cover member 100 which is provided with a centrally located aperture through which is disposed and secured the bearing 90. It may thus be seen, that the dial disk 36 is coupled to the bearing 90 only by means of the spiral spring 96 which restores the dialing mechanism to its original position against a fixed stop (not shown) which extends forwardly from the cover 28 within the recess 32 thereby to engage an abutting member 99 which extends rearwardly from the dial disk 36. A dish-like cover plate 104 having a forward surface substantially mating the rearward surface of the central portion of the cover 28 is attached thereto and to the sleeve bearing 90 by means of a female nut 106 having a central aperture thereof threaded to mate and engage with a threaded male portion 108 of the bushing 90. A resilient washer **110*a* is provided intermediate the nut 106 and the inner cover plate 104 to enable a good friction bond between the cover and the other members which are compressed against an annular shoulder 102 provided on the outer surface of the bearing member 90**.

In order to transmit to the memory apparatus 81 an indication of the relative position to which the dial mechanism is rotated to make a channel selection, the rearward face of the channel selector disk 36 intermediate the rearward flange 98 and the finger holes 38 is provided with a rearwardly directed spirally cammed surface 109 which is flush with the rear wall of the selector disk 36 at a position corresponding to the first of the finger holes 38, marked in Fig. 2 with the numeral 2, and gradually raises rearwardly to a considerable thickness at a position corresponding to the last of the finger holes 38 (marked in Fig. 2 with the word OFF). A cam actuated plunger 110 is housed within a sleeve bushing 112 which in turn is supported in a recess 114 in the inner cover 104 and is adapted to engage the outer edges of the inner cover 104 about an aperture 116 which is provided therein near the enter portion thereof opposite the spiral cammed surface 109 on the dial 36. Therefore, as the dial 36 is rotated, the cam actuated plunger 110 is pushed rearwardly into the selector housing by an amount dependent upon the relative rotation of the dial 36 with respect to the selector casing 24.

In order to utilize this rearward movement of the cam actuator plunger 110 so as to set up a condition on the memory mechanism 81 which at some future time will automatically tune the television receiver to that channel which is selected, a bracket 118 having an aperture 119 near one end thereof is pivotally attached to an adjustably positionable fulcrum member 122. The fulcrum member 122 (best shown in Fig. 7) includes a split bushing 121 having a threaded central aperture which will lock adjustments made with the threaded stud 127. The bushing 121 is staked into the aperture 125 in the inner cover 104. A threaded stud 127 having a slot **127*a* at one end is riveted to the bracket 118 at its other end. A hole 129 is formed in the dial disk 36 opposite the location of the fulcrum member 122 to accommodate a screwdriver for convenient adjustment of the point about which the bracket 118** may be pivoted. This adjustment eliminates the necessity of meeting close tolerances in machining many parts of the mechanism.

Intermediate the ends of the bracket 118 there is provided an enlarged aperture 124 which freely surrounds the bearing 90 such that there is no interference whatever between the operation of the bracket 118 and that of the bearing 90.

In order to insure that the bracket 118 occupies a position corresponding to the relative rotation of the dial disk 36, the bracket 118 is spring loaded against the cam actuated plunger 110 by means of a leaf spring 126 which is riveted at one end to the bracket 118 and which is provided at its other end with an aperture 130 which loosely surrounds the shaft 70 and associated washers 85 so that the spring 126 is not fixedly attached to the shaft 70 or the memory apparatus 81 but is merely self-biased thereagainst. Consequently, the leaf spring 126 biases the bracket 118 against the rearward end of the cammed plunger 110 and does not transmit any appreciably torque from the disk 82 or the shaft 70 to the bracket 118, the rotation of which is limited by the edges the aperture 124 therein abutting against the bearing 90.

In order to store the information which may be supplied to the memory apparatus 81 by means of the time selector knob 50 and the channel selector dial 34, the disk 82 supports a plurality of sleeve bearings 124 which are attached to the disk 82 at the forward ends thereof in spaced apertures 122. Although the sleeves 124 and the disk 82 and associated washers 85 are shown as separate units, they may conveniently be a unitary metal casting or an integral plastic member molded in a single operation. A plurality of selector pins 120 are respectively supported for axial movement in the sleeve bearings 124 which are each provided in the walls thereof with an opening 126 extending into the central recesses of the respective pins, which opening is positioned outwardly along the radii of the selector disk 82 on which the respective sleeves 124 are mounted. The passageways 126 accommodate the inner ends of triangularly shaped leaf spring detent members 128 which are attached to the disk 82 by means of rivets or by any other suitable means. The forward end of each of the selector pins 120 is apertured at 129 for engagement with one end of a respective one of a plurality of bias springs 130, the other ends of the springs 130 abutting against the forward side of the selector disk 82 about the respective apertures 122 therein such that the springs 130 bias the selector pins 120 toward the front of the selector casing. In order to arrest such forward thrust of the pins 120, annular stops 132 are provided near the rearward end of each of the selector pins 120 for abutment against the walls of the sleeve bearings 124 adjacent the biasing surface therein. In addition to the final arresting or stopping action of the annular stop 132, a plurality of tapered annular grooves 134 are provided intermediate the ends of the selector pins 120 and are adapted to be engaged by the inner ends of the respective leaf springs 128 which extend through the passageways 126 in the bearings 124 such that each selector pin 120 may be held in a selected one of a plurality of axial positions with respect to the disk 82 as the ends of the springs 128 are forced into one of the plurality of grooves 134. By selecting the groove which is acted upon by a particular leaf spring detent 128, the relative axial position of the respective pin 120 may be adjusted and is retained in that selected position.

Because the grooves 134 are outwardly tapered in a forward direction, a force which is exerted on the forward end of any of the pins 120 toward the rear of the casing, may be used to selectively move that pin toward the rear of the casing in step-by-step fashion as the respective spring 128 snaps into each succeeding groove 134. When, however, this force is removed from the pin 120, it will not return to the final arrested position against the stop 132 but will remain in the selected position because of the detent action of the groove and the inner end of the respective spring 128.

In order to exert a positioning force on a selected one of the pins 120, the upper end of the bracket 118 is offset at 136 to provide an end portion 138 having a width not appreciably exceeding the diameter of each of the pins 120 and which is adapted to be positioned opposite the guide path of the pins 120. The particular pin 120 which is aligned with the end 138 of the bracket 118 is determined by the angular position of the disk 82 and, consequently, the angular position of the time selector knob 50. Each selector pin 120 corresponds to a particular interval during a twelve-hour period, that interval being indicated by the particular time graduation on the dial 44 which is aligned with the index 46 when the respective selector pin is aligned with end 138 of the bracket 118. When, therefore, the dial mechanism 34 is rotated such that the cam actuated plunger 110 is driven rearwardly by the action of the cam surface 109 by an amount depending upon the relative rotation of the dial disk 36 with respect to the cover 28, the bracket 118 is pivoted about the fulcrum 122 and that pin which is aligned with the end 138 thereof is axially moved to the position corresponding to the amount the dial disk 36 is rotated. Thereafter, when the dial 36 is released and is returned to its original position by means of the spring 96, the selector pin 120 is retained in its selected position by means of the coaction of the respective spring 128 and the selected annular groove 134. Furthermore, since that selector pin 120 which is so positioned is determined by means of the angular position of the selector disk 82 with respect to the end 138 of the bracket 118 which is fixed with respect to the casing, the pins are conveniently selected by rotation of the knob 50. It may be seen thus far that rotation of the time selector knob 50 determines which selector pin 120 will be acted upon by the bracket 118 in response to the rotation of the cammed surface 109, and the selected groove 134 in the selector pin 120 is determined by the amount that the dial mechanism 34 is rotated. Simply then, in the memory mechanism 81, a particular pin 120 identifies a particular time interval and the axial position of that pin identifies a particular channel.

Since most television programs are at least fifteen minutes long, for reasons of economy, the embodiment of the television program selector of the present invention which is shown and described herein, is adapted to control a television receiver throughout periods of no less than fifteen minute intervals. Therefore, forty-eight selector pins 120 are provided, but it will be understood, of course, that this is a matter of design and control of the receiver at more frequent intervals can be provided by merely increasing the number of selector pins 120 which are provided.

In order to insure that the selector disk 82 is so positioned in response to rotation of the knob 50 that one of the selector pins 120 is in accurate alignment with the actuating end 138 of the bracket 118, a plurality of apertures 140 are provided in the disk 82, one aperture for each selector pin, and the respective apertures are located towards the center of the disk 82 on the same radii as the pins. An aligning stud 142 extends rearwardly from the offset portion of the bracket 118 and is adapted to be aligned with one of the apertures 140 only when the end 138 of the bracket 118 is aligned with the respective selector pin 120. Therefore, incorrect time and channel selections are avoided because the dialing mechanism 34 cannot be operated to position one of the pins 120 unless the stud 142 is so aligned as to pass through one of the apertures 140. If such a stud 142 were not provided, it would be possible for the end 138 of the bracket 118 to be moved rearwardly between adjacent ones of the selector pins 120 and set either one or both of these pins at an incorrect axial position by acting upon their respective bias springs 130 rather than upon the forward end of one of the pins 120.

Also, to assist the person making the selection in so aligning the selector pin that the alignment stud 142 is arranged exactly opposite a particular alignment aperture 140, a spring loaded detent 144 comprises a bracket 143 which is attached at one end to the casing 24 and has attached thereto at its other end a leaf spring 145 on which is supported a rotatable cylindrical member 146 which is thusly spring biased outwardly against the inner surface of the individual sleeve bearings 124 such that if the member 146 is not accurately positioned between adjacent sleeve bearings 124, the cylinder 146 tends to rotate the disk 82 by such an amount that the cylindrical detent 146 is centered between the two adjacent cylindrical sleeves 124.

Whereas, a cylindrical roller 146 which is spring biased against the cylindrical sleeves 124 is illustrated as a detent arrangement for use with the subject selector, it will be understood that other types of detents may be used, such, for example, as one in which the sleeves 124 are each provided with a generally triangular inner surface to insure that the roller 146 does not ride upon the inner surface of any one of the sleeves but is always forced within the space between adjacent sleeves.

In order to facilitate a clearing of the memory mechanism such that all of the selector pins 120 are returned to a common position with the stops 132 in abutment with the respective sleeves 124, the holding springs 128 are so constructed that a rearward force applied thereto releases the respective pins so that they are each returned to the cleared position by the biasing springs 130. In detail, the detent springs 128 are generally triangular in shape and formed from strips of spring metal. Each spring has one leg 128*a* positioned along the radii of the disk 82 on which the respective selector pin 120 is located, an inwardly and rearwardly directed leg 128*b* which intersects the first leg at an angle of approximately thirty degrees and a third leg 128*c* forwardly directed and meeting the leg 128*b* at an angle of about sixty degrees. It will thus be seen that the legs 128*c* normally extend forwardly along lines parallel to the axis of the respective pins 120. The open ends of the legs 128*c* are bent outwardly from the triangle formed by the springs' legs but inwardly with respect to the disk 82 on which they are attached. These open ends of the detent springs extend within the recesses in the sleeves 124 and are self-biased against the pins 120, the off-turned ends being of such length that the legs 128*c* always exert an inward force thereon. When, however, a rearward force is applied to the legs 128*a*, the springs 128 are pivoted about the rearward corner of the triangular spring which abuts against the respective sleeves 124 so as to withdraw the ends of the detent springs 128 from engagement with the pins 120. When the ends of the detent springs 128 are disengaged from the pins 120, the bias springs 130 force the pins 128 forwardly until the annular stop 132 abuts against the rearward ends of the sleeves 124. To simplify the manufacture and construction of this mechanism, the brackets 84 may be formed integrally with a relatively few spaced ones of the springs 128.

In order to enable a person making the selections to quickly and accurately erase the previous selections which are stored on the memory mechanism 81, a wheel 150 is supported for rotation about the principal axis thereof on an axle 152 which is disposed within the casing 24 and preferably extends downwardly from the upper wall thereof, through a hole 154 which is larger in diameter than wheel 150. The upper end of the axle 152 is provided with an annular recess 156 which is adapted to engage with the walls of an aperture 158 in a slidable bracket 160 which is attached to the casing by means of a threaded, bearing stud 162, which has the body portion thereof extending within an elongated slot 164 provided in the bracket 160. The forward end of the bracket 160 is upturned and a finger button 166 is attached at the forward side thereof conveniently by means of a screw 168 such that when a force is applied to the forward end of the button 166 the bracket 160 is slid rearwardly, guided by the stud 162 and slot 164, so as to force the wheel 150 against the particular detent spring 128 which is aligned therewith. Consequently, by holding the button 166 in a rearward position and rotating the knob 50 through 360°, all of the springs 128 are consecutively forced in a rearward direction so as to release each of the selector pins in turn and thereby clear the memory mechanism 81. It has been found that a spring return for this clearing mechanism is unnecessary since the inherent action of the springs 128 restores the bracket 160 to its normal position when the external force is removed therefrom.

As hereinbefore stated, the clearing mechanism including the wheel 150 and the manually operated clearing button 166 may be located at any desired position about the casing 44; however, it has been found to be desirable to utilize a portion of the outer housing for the clearing mechanism as the time indexing pointer 46. Consequently, a tapered cover 159 encloses the top and sides of the bracket 160 and associated parts, and the index pointer 46, which has an aperture 161 through which extends the button 166, thus serves both to enclose the front of the clearing mechanism and to provide a reference marker for the time dial 44.

In order to utilize the information contained in the memory system 81, a selector switching mechanism 199 is adapted to be periodically and successively actuated by each of the selector pins so as to provide a signal which is indicative of the channel selected and, consequently, of the particular annular groove 134 in which the detent spring 128 is positioned. As shown, in the dialing disk 36 there are eight finger holes corresponding to seven television channels and one "off" position, and correspondingly, there are eight grooves 134 in each selector pin 120, seven for channels and one for an "off" position. Each selector pin 120 can, however, occupy nine positions, the ninth position being the cleared position which is that position occupied when the selector pin 120 is fully withdrawn by the bias spring 130 and the annular stop 132 is abutting against the rearward end of the sleeve 124.

The switching mechanism which utilizes the position of a selector pin 120 to provide a channel switching signal includes a support swing 170 which is pivoted at the ends thereof in pivot bearings 172 and 174 located at diametrically opposite points on the selector casing 24. In close proximity to one end of the swing support 170 there is provided an outwardly extending annular flange 176 which is provided with a notch **176*a* in the outer periphery thereof to accommodate one end of a spring 173 which is coiled about the swing support 170 intermediate the flange 176 and the respective end thereof, which spring 173 has the other end adapted to be engaged in a groove 172*a* in the pivot bearing 172. It will thus be seen that the intermediate portion of the swing support 170 is urged in a forward direction by the coil spring 173 such that a feeler member 178, which is attached to the swing 170 by means of a cross member 180 by means of rivets 180*a* and 180*b*, is urged forwardly against the rearward surface of a selected one of the pins 120. The feeler member 178 is generally truncated, having the minor side thereof directed toward the face of the selector 20 and so dimensioned that the feeler 178 rides on the rearward end of one of the selector pins 120. In order to prevent the feeler 178 from becoming stuck between adjacent ones of the pins 120, the rearward end of the pins 120 are tapered at 120*a* such that coaction of the tapered ends 120*a* and the tapered side of the feeler 178 causes the feeler member 178 to ride up and down the tapered surfaces of the pins 120 as the disk 82 is rotated. So as to enable fine adjustment of the swing 170 with respect to the pins 120, a screw 179 is threaded in an aperture in member 180 and may conveniently be used to adjust the position of the feeler 178 relative to member 180 and hence to the swing 170**.

It will be seen thus far that the axial position of the particular selector pin 120 which is aligned with the feeler member 178 determines the relative position of the intermediate portion of the swing 170 with respect to the forward wall of the casing 24.

In order to utilize the axial position of a selected one of the pins 120 to position the switching mechanism, thereby to supply a channel position signal to be used in adjusting the tuner of the television receiver, a contact carrying follower arm 182 is mounted for universal movement within a limited area. This movement is enabled by means of a pair of cross pivot supports comprising a first axle 184 located parallel to the plane of the selector disk 82 and a second axle 188 located perpendicular thereto and parallel to the axis of rotation of the selector disk 82. The axle 184 is supported between the ends of a pivoted channel bracket 186 which itself is rotatably mounted on the axle 188 which is secured to the back of the housing 24. The ends of the axle 184 extend outwardly from the sides of the bracket 186 and tines **182*a* and 182*b* of the bifurcated inner end of the follower arm 182** are pivotally secured thereto.

The axle 188 may conveniently be riveted to the back of the housing 24 and a spring 192 is coiled about the axle 188 between the extending arms of the channel bracket 186. One end of the coil spring (forward end )is attached to the inner arm of the channel bracket 186, and the other arm extends outwardly and is self-biased against the outer casing of the gear box **64*a* of the clock motor 64. The follower arm 182 is thus urged by the spring 192**, looking from front to rear, in a counter-clockwise direction.

In order to bias the follower 182 in a forward direction so that it rides on and thus accurately follows the position of the swing support 170, a leaf spring is fixedly attached to the principal leg of the channel bracket 186. The leaf spring 190 thus exerts a forward force on the follower 182 which is only overcome by the rearward force of the swing support 170 as it moves rearward under the direction of the particular pin 120 on which the feeler 178 is riding. It may be seen thus far that the position of the end of the follower 182 along the principal axis of the selector 20 is dependent upon the axial position of that selector pin 120 which at the time in question is in engagement with the feeler 170.

In order to translate the axial position of the respective selector pin 120 and consequently that of the follower arm 182 into an electrical signal, a stop plate 196 having a slotted aperture 197 is disposed within the casing and supported from the rear wall thereof such that the outer end of the control member 182 extends through the slot 197. As a result of the co-action of the leaf spring 190 and the coil spring 192, the follower arm 182 is biased forwardly and in a counter-clockwise direction such that looking down at the selector from front to rear, the follower arm 182 is resiliently urged toward the forward left-hand corner of the slot 197.

Figure 8:
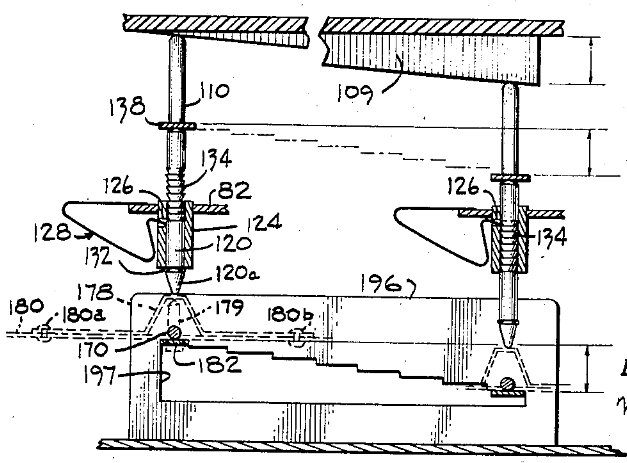
Fig. 8 is a schematic developed view of the selector and switching apparatus of Fig. 3 which is used to facilitate an understanding of the operation of the selector mechanism.

The operation of this portion of the mechanism may best be understood by reference to Fig. 8 wherein is shown a developed view in schematic form, of the cam surface 109, and the cam actuated plunger 110 which acts through the end 138 of the bracket 118 to position a selector pin 120 to one of the selected positions and which in turn transmits this position to the feeler member 178. In Fig. 8, the stop plate 196 is viewed from above and from without the casing 24, and the following description will refer to the stop plate 196 as shown therein.

The upward edge of the slot 197 is provided with a plurality of steps corresponding to the number of axial positions in which each selector pin 120 may be retained. Consequently, there are nine steps provided. If, for example, the particular selector pin which is actuating the feeler member 178 is in its fully forward position such that it is only arrested by the annular stop 132 (left side of Fig. 8), the outwardly extending portion of the arm 182 will occupy the topmost position in the slot 196 since it is urged upwardly by the spring 190 and to the right by the spring 192 against the step of the succeeding slotted position. In order to position the follower arm 182 in step by step fashion to the right as the actuating pins 120 are positioned groove by groove in a downward direction, the height of each step on the plate 196 is substantially equal to the spacing between the annular grooves 134 in the pins 120. As heretofore discussed, the spacings between the grooves 134 are equal to the dimension of the cam 109 between successive finger hole positions in the dial member 136. Therefore, at any instant of time the angular position of the follower arm 182 is indicative of the axial position of the particular pin 120 which is then actuating the feeler member 178.

Although in Fig. 8, the cam surface 109 is illustrated as being in operative contact relationship with a particular selector pin 120 it is to be understood that this figure is utilized to show the relationship of the various parts not in a true physical sense but rather in an operative sense. Actually, at the time the feeler 178 and the follower arm 180 are positioned by a pin 120, the cam surface 109 and the follower 110 are no longer in operative relationship with the pin. In order to set the pin 120 in that position shown, however, it is necessary that at some previous time the cam 109 was rotated to the position illustrated and that the respective detent spring 128 retained the pin 120 in the axial position selected by the adjustment of the cam 109. This developed view of the cammed surface 109 shows it to have a constant slope.

In order to utilize the position of the follower arm 182 as determined by the step in the plate 196 in which it is located, a plurality of contact buttons 210 are arranged on the arc of a circle, each of the buttons 210 being located directly behind one of the steps in the plate 196. Attached to the bracket 186 and extending outwardly therefrom for pivotal movement therewith are a pair of contact carrying arms 198 and 200 respectively supporting contacts 198*a* and 200*a* near the ends thereof. The arms 198 and 200 are constructed of a resilient material such that the contacts 198*a* and 200*a* are respectively forced against the contact buttons 210 which are contained in an electrical contact housing 202. The housing 202 generally contains a cup-like forward portion 204 and a cover member 206. An aperture 208 is provided in the lower portion of the wall 202 to accommodate a multiple cable conductor 209 which includes at least eight insulated conductors one for the "off" condition and one for each of the seven channels which may be automatically tuned in. There are eight contact buttons 210 and associated connecting lugs 212 which are connected to respective ones of the eight conductors in the cable 209. The contact buttons 210 extend through respective apertures in the bottom of the casings 202 and coact with the contact button 200*a* on the contact arm 200 through a semi-circular aperture 214 in the rear wall of the casing 24. The buttons 210 are respectively aligned with respect to the plate 196 such that the contact member 200*a* is connected at any one time to only one particular button 210, that being the button 210 which corresponds to the angular position of the follower arm 182 and, consequently, to the particular finger hole which was previously selected during the dialing operation to axially position that pin 120 which is then controlling the position of the arm 180.

In order to energize the movable member 200 and hence a selected one of the contact buttons 210, the contact 198*a* is adapted to ride on a semi-circular conductive segment 216 which is electrically connected through an electric conductor 218 to one terminal 220 of a simple on-off normally off type impulse switch 222. It may thus be seen that the terminal 220 of the switch 222 is connected to a selected one of the contact buttons 210 through the contact arms 198 and 200 and the contacts 198*a* and 200*a*.

In order to utilize the particular contact which is selected by the switching mechanism 199 to properly tune the television receiver only at the exact instant when it is desired to do so, which ordinarily would be at one of the station breaks which generally occur at fifteen or thirty minute intervals, it is necessary that the selector disk 82 be rotated in unison with the time of day, which, of course, is the same time base on which the television stations operate. Therefore, a clutch means is provided for driving the disk 82 by means of the clock motor 64. This clutch means is so constructed that during set-up of the memory mechanism 81, the selector disk 82 and the time dial 44 are automatically disconnected from the output shaft of the motor 64. This torque transmitting clutch generally comprises a driving and synchronizing disk 240 which is pressed on the hour shaft 242 thereof and which rotates in a counter-clockwise direction. The disk 240 is provided with a tapered notch 244 which is adapted to engage with a cylindrical rotatably mounted member 246 which is spring loaded against the periphery of the disk 240 by means of the action of a conventional coil spring 248. The spring 248 is attached at one end to a stud 250 which extends rearwardly from the disk 82 and attached at its other end to a pivoted arm 254. More particularly, the spring 248 is attached to a stud 252 which extends rearwardly from the bracket 254 at one end thereof and which is pivoted at its other end about a stud 256 which is attached to and extends rearwardly from the selector disk 82. The spring tension provided by the spring 248 is sufficient during normal operation to hold the cylinder 246 in the slot 244 such that torque from the disk 240 is transmitted to the disk 82, whereby rotation of the disk 240 causes a corresponding rotation of the selector disk 82.

When, however, the time selector knob 50 is manually rotated as, for example, in setting up a number of selections, the torque thus manually supplied to the disk 82 is sufficient to cause the roller 246 to roll out of the notch and thereby to freely rotate about the periphery of the disk 240. During the time that the memory mechanism 81 is being set up and the disk 82 is freed from the drive disk 240, the disk 240 is continually rotated by the clock motor 64 and, of course, so that after the selection is complete and the roller 246 is returned to the notch 244 the disk 82 is once more in synchronism with the output shaft 242 of the clock motor and thereby synchronized with time. Consequently, the dial 44 indicates the correct time of day.

In order to prevent the transmission of a signal to the television tuner motor during selection of a various number of programs to be viewed in the future, there is provided a synchronizing switch 247 which is biased open and is closed by the positioning of the roller 246 in the notch 240, so that when the roller is not within the notch 240 the switch is open, thereby opening the circuit to the brush 200*a* and, consequently, to the control buttons 210. This synchronizing switch, therefore, is only closed when the disk 82 is in synchronism with the clock motor. The synchronizing switch 247 generally comprises an annular rearwardly extending portion 250*a* integral with the disk 240 and which is provided on its inner wall with a conductive ring 252*a* and on its outer wall with a conductive ring 254*a*. Conveniently, the disk 240 may be molded of plastic and the rings 252*a* and 254*a* may be formed of brass or may be metallic layers deposited on the inner and outer walls of the ring 250*a*. A pair of contact brushes 256 and 258 are supported from a cylindrical support member 260 which is fastened to the gear box casing 64*a* by means of a slotted screw member 262.

Figure 10:
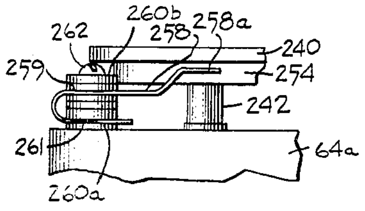
Fig. 10 is a fragmentary front elevation view of a portion of the synchronizing mechanism shown in Fig. 5 taken along the line 10—10 thereof.
Figure 11:
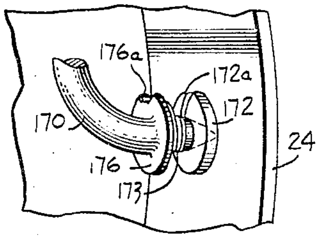
Fig. 11 is a fragmentary perspective view of a portion of the selector feeler mechanism of Fig. 5 wherein the spring bias member is shown in detail.

Referring to Fig. 10, each of the brushes 256 and 258 are formed of conductive wire of the type having a circular cross section. In order to prevent the twisting of the brushes 256 and 258 in the support member 260 such that a good conductive contact between the brushes 256 and 258 and the conductive rings 252 and 254 would no longer be effected, the supported member 260 is provided with two slots 259 and 261 for each brush supported thereby. The slot 259 is arranged substantially parallel to and directly above the slot 261 and the supporting portion of one of the ends after extending through the slot 259 is bent back on itself through and extends through the lower slot 260. The contact portions 256*a* and 258*a* are semicircular in shape so as to provide a good contact surface which has a low coefficient of friction and thus presents a minimum of retarding force to the disk 240.

In order to facilitate the manufacture of the brushes and support assembly which includes the brushes 256 and 258 and the support 260, the support 260 is formed in two parts, a bottom portion 260*a* and a top portion 260*b*, the line of demarcation being at the location of the apertures 259. Consequently, the contact members 256 and 258 may be preformed and properly positioned in the member 260*a*, before the member 260*b* is attached to the bottom member 260*a*, thereby to secure the brushes 256 and 258 in place. At the same time that the top member 260*b* is secured to the bottom member 260*a* by the screw 262, the entire support and brush assembly is secured to the clock motor gear case 64*a*.

An aperture 263 is provided at such a location in the disk 240 that it partially overlays the inner wall of the annular extending portion 250*a* such that the end 265*a* of a spring contact member 256, which is positioned in the slot, makes contact with the inner ring 252*a*. The spring switch member 265 is generally in the form of a horseshoe being spring biased outwardly and having the end 265*b* so positioned that it is biased to ride in close proximity but not in contact with the outer contact ring 254*a* unless it is forced into contact position by the roller 246 being spring biased within the notch 244. A flexible conductor 264 is connected to the brush 258 and extends without the program selector 20 to a source of power energization such, for example, as a standard 117 volts A. C. source. For convenience, but not by necessity, the conductor 264 may be included in the cable 209. The inner contact brush 256 is connected by means of a flexible conductor 266 to the terminal lug 268 of the switch 222.

It will thus be seen that power energization is supplied to the impulse switch 222 through the synchronizing switch 247 only when the hour shaft 242 of the motor 64 and the disk 82 are in synchronism. At all other times, such as during the setup of the memory mechanism 81, even though the follower arm 182 may be moved to various positions by ones of the selector pins 120, and the impulse switch 122 is closed, the tuner of the television receiver is not rotated to those various positions as the disk 82 is manually rotated. When, however, the disk is returned to the synchronized condition so as to be rotated by the motor 64, the synchronizing switch 265 is closed, and television tuner is once more placed under the control of the program selector 20.

Since the follower arm 182 and, consequently, the contact 200*a* are only properly positioned when the feeler 178 rides on the end of a selector pin 120, there is a considerable time during each fifteen minute interval when the follower arm 182 occupies a position which is not indicative of the axial poistion of any one selector pin. It is, therefore, important that the television tuner not be adjusted in accordance with these erroneous positions of the follower arm 182. In order that the tuner will only be adjusted once during each fifteen minute interval and then only when the follower 182 is correctly positioned, an arrangement is provided to close the signal circuit only during the brief interval of the time in which the feeler 178 is poistioned on a pin 120.

This arrangement includes shaft 270 which is adapted to be completely rotated once every fifteen minutes extends from the gear box 64*e* and is adapted to rotate a cam 272 through 360° during each fifteen minute interval. The surface of the cam 272 is such that as the cam rotates in a counter-clockwise direction once during each fifteen minute interval, the follower arm 182 is moved to a full clockwise position as the cam surface rides on the cam follower 274 which is securely attached to the control member 182. The cam surface is also such that the contact buttons 222*a* and 222*b* of the impulse switch 222 are closed for substantially less than one minute during each fifteen minute interval and the time during which this switch is closed immediately follows the time at which the control member 182 is released by the trailing edge 272*a* of the cam 272, and is thereby accurately positioned by the swing 170 since at the time the switch 222 is closed, the feeler 178 is riding on the end of a single selector pin 120. Consequently, once during each fifteen minute interval the follower arm 182 is driven to its farthest clockwise position by the cam 272 and is then released such that it is accurately repositioned by means of the feeler 178 acting upon a respective selector pin 120. Shortly after this new positioning of the control arm 182 is made, the impulse switch 222 is closed whereby the power line which is connected to the conductor 264 is connected to one of the contact buttons 210. As previously indicated, there are nine steps but only eight buttons. The step that does not have a button is that one corresponding to the cleared position of the selector disk 82 wherein the particular pin 120 is in its fully forward position. Therefore, if when the impulse switch 222 is closed the respective selector pin is in a forward or cleared position, there is no signal connected to the tuner positioning device and the television tuner will remain in the position which it occupied during the preceding fifteen minute interval.

Once during each fifteen minute interval, then, the impulse switch 222 is closed and unless the respective selector pin 120 is in the cleared position, the source of power energization (not shown) is connected to a selected one of the conductors in the cable 209. Since the particular conductor which is so connected is selected in accordance with the axial position of the respective selector pin 120, the energized conductor is indicative of the channel to which the television tuner should be adjusted. Energization of one of these conductors is, as heretofore described, indicative of the fact that the television receiver should be switched off.

Referring to Figs. 12, 13 and 14, there is shown a motor search unit 284 which is adapted to be mechanically attached to the back of a television receiver so as to adjust the tuner thereof to receive the signal which is transmitted in a selected one of a plurality of television channels. The unit 284 includes a conventional shaded pole motor and gear train 286 which comprises a conventional magnetic structure 288, a gear box 290 in which are enclosed the speed reduction gears and an output shaft 291. Such a drive unit has an axial rotor clutch such that once power energization is removed therefrom the shaft 291 stops rotating within a few minutes of a degree. If desirable, a pluraltiy of detents equal to the number of channels to which the tuner may be adjusted can be provided about the shaft 291 to insure that the tuner shaft will be in the exact position to properly receive the signal being televised on the selected channel. Since, however, it is common practice to include such a detent arrangement as an integral part of the television tuner itself, it is generally unnecessary to provide such detents in the search unit 284.

Attached to the back of the gear case 290 is a position selector switch 292 which is used to interrupt the supply of current to the motor 286 when the tuner shaft is so positioned as to receive the signal being televised on the selected channel. If, for example, the one of the conductors 209 which corresponds to channel 2 is energized, then switch 292 functions to stop the motor 286 when the tuner is adjusted to channel 2.

The tuner position control switch 292 is contained within a cylindrical cup-shaped housing 294 having an integral base portion 295 and a removable disk-like cover portion 296. The housing 294 is attached to the gear case 290 by means of a pair of headed screws 293 which extend into the gear case 290 from the inner side of the housing 294. The bottom portion 295 is apertured at **295*a* to loosely engage the drive shaft 291 of the motor 286. The cover 296 is conveniently attached to the housing 294 by means of a pair of diametrically oppositely located screws 297 which are adapted to be received in threaded apertures in the cylindrical wall of the housing 294. Twelve equally spaced cylindrical apertures 298 are provided in the cylindrical wall of the housing 294 which is also provided with twelve radial slots 300 which are so positioned as to bisect the recesses 298. Twelve flat contact brushes 302 conveniently formed from copper strips are respectively positioned in the slots 300 so as to be supported by the wall of the housing 294 and disposed within the cavity therein. That poriton of each of the contact members 302 which is intermediate the ends thereof and aligned with the respective one of the recesses 298 is stamped out so as to form a semicylindrical surface which is located within the recesses 298. That portion of the contacts 302 which extends within the cavity in the housing is off-turned from its respective radii in the direction of rotation of the shaft 291** which looking toward the back of the television receiver is counter-clockwise.

The cover member 296 is provided with a plurality of apertures 304 which register with the recesses 298 when the cover 296 is attached to the housing 294 by means of the pair of screws 297. The eight signal carrying conductors in the cable 209 are respectively connected to individual ones of the contact members 302 by inserting the ends of respective ones of the conductors into the recesses 298. To simplify the connection of the conductors to the contact members 302 each conductor is provided at the end thereof with a rod-like portion 306 having a diameter slightly less than that of the aperture 304 and the recess 298. Therefore, when a terminal 306 is inserted within a recess 298, it is frictionally engaged by the resilient contact member 302, whereby it is held in place and electrically connected to the contact 302.

A rotor 308, which is provided with a central aperture 310 which is adapted to receive the rearwardly extending end of the shaft 291, is further provided with a rearwardly extending narrow cylindrical portion 312, an intermediate annular outwardly extending portion 314 and a forward cylindrical portion 316. The rotor 308 is constructed of an insulating material such as, for example, plastic and an annular conductive disk 318, which has an inner diameter approximating the diameter of the forwardly extending portion 316, is attached to the member 308 in abutment with the forward wall of the annular portion 314 thereof. The outer diameter of the conductive ring 318 exceeds the outer diameter of the intermediate annular portion 314 of the rotor 308 so that the contact members 302 are self-biased toward and ride on the periphery of the ring 318. A leaf spring contact carrying member 320 is riveted to the base 295 of the switch housing 294 and has mounted thereon a contact button 322 which is spring biased against the forward surface of the ring 318 so as to be electrically connected to those contact members 302 which are self-biased against the periphery of the ring 318. The contact carrying arm 320 is electrically connected to one of the input leads of the motor unit 286.

In order that all but a selected one of the contact members 302 is connected to the contact carrying arm 320 through the annular ring 318, the ring 318 has a recess **318*a* provided in the periphery thereof, which recess extends toward the center of the ring 318 by an amount such that when this recess is in alignment with any one of the contact members 302, that particular contact member will ride on the outer surface of the intermediate portion 314 of the insulating support member 308 and not on the conductive ring 318. Therefore, when the recess 318*a* is in alignment with one of the contacts 302, that conductor in the cable 209 which is connected to this particular contact 302 is disconnected from the tuner positioning motor 286**.

In order to permit the accurate positioning of the recess **318*a* with respect to one of the contact members 302, the rearwardly extending portion 312 of the insulating rotor support 308 is threadedly apertured at 320 so as to coact with a set screw 323 thereby to fixedly secure the rotor to the shaft 291** in any desired angular relationship therewith.

To facilitate an understanding of the electrical operation of the television program selector and motor search unit, attention is now directed to Fig. 15 wherein is illustrated a schematic diagram of the electric circuit of the present invention. In this figure a pair of supply lines 280 and 282 are adapted to be connected to a source of power energization such, for example, as a conventional alternating voltage source having a potential of 117 volts and a frequency of alternation of sixty cycles per second. The power line 282 is connected to a conductor 324 and a conductor 325 through the motor search unit 284 to one side of the clock motor 64, the other side of the clock motor 64 being connected through a conductor 326 and a conductor 327 to the other power energization line 280. Consequently, the clock motor 64 is at all times connected across the supply lines such that it is always operating in synchronization with the time of day. The television receiver 22 is indicated in Fig. 15 as a resistive load connected through its on-off switch **22*a* to one of the contact members 302. This same contact member 302 is connected to a conductor 328 which is energized when the selector switch 199** is positioned to the "off" position.

When the rotor 308 is in any position such that the "off" contact member 302 is operatively engaged with the ring 318, the television receiver 22 is connected across the power supply lines 280 and 282 as follows: from the line 280 through the conductor 327, through the receiver 22, through the on-off switch **22*a*, through the "off" contact member 302, through the contact members 320 and 322 and through the conductor 324 to the line 282. When, however, the "off" contact member 302 is positioned opposite the recess 318*a* in the annular ring 318**, the power energization to the receiver is interrupted and the receiver will remain disconnected as long as the rotor is in this position.

Figure 5:
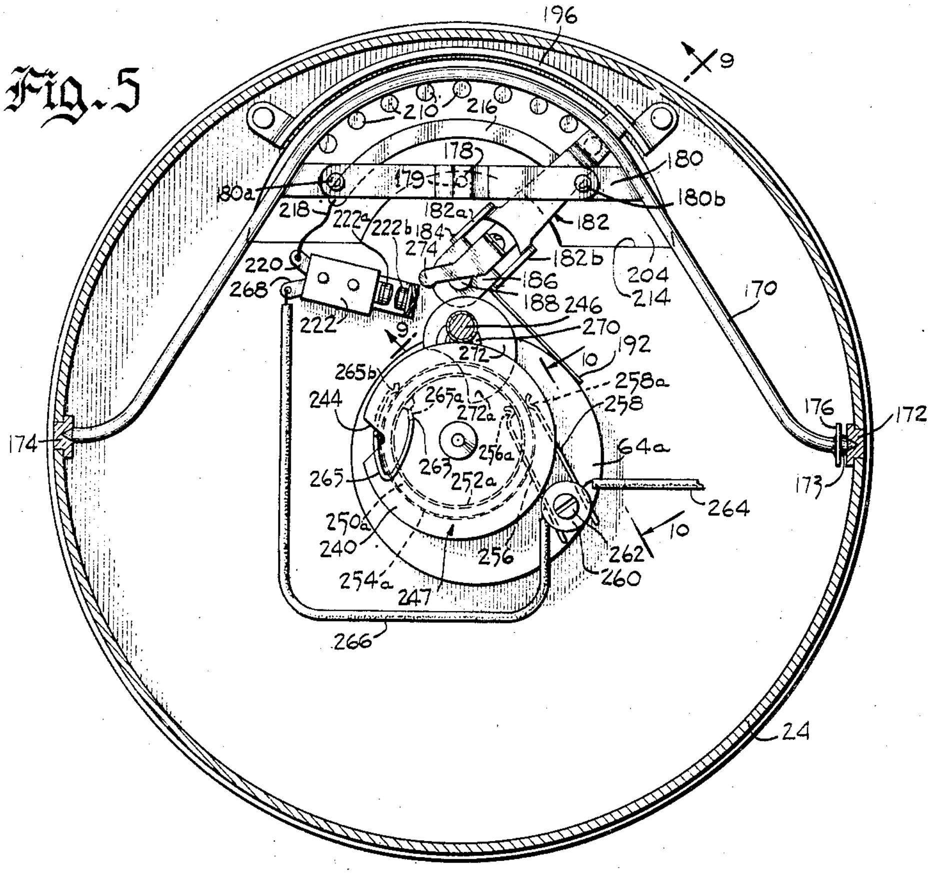
Fig. 5 is a sectional view of the apparatus of Fig. 3 looking rearward along the line 4—4 thereof, assuming that all of the apparatus is shown therein.
Figure 9:
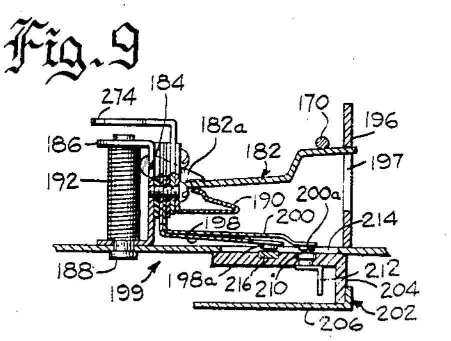
Fig. 9 is a view of the selector switching apparatus of Fig. 5 taken along line 9—9 thereof.

The tuner motor 286 has one terminal thereof connected through a conductor 330 to the conductor 327 and thus to the power line 280 and the other terminal thereof connected through a conductor 332 to the selector unit 20. The conductor 332 connects to the conductor 264 (Fig. 5) to the on-off switch 334 which is used to disconnect the selector unit 20 from automatic operation when this switch is in the "off" position. For purposes of clarity the switch 334 is not shown in the mechanical drawings of the selector 20. The other side of the switch 334 is connected through the synchronizing switch 247 and through the impulse switch 222 to the selective switch 199.

In order to utilize the signal provided from the selector switch 199 to drive the tuner shaft to the desired angular position, the output shaft 291 of the tuner drive motor 286 is adapted to be connected to the shaft of the tuner which, of course, for V. H. F. operation may be positioned in twelve different positions. Each of these positions corresponds to a different television channel. Since, however, it is unlikely that twelve stations will be available in any one area, the preferred embodiment of the selector of the present invention utilizes only seven channel positions and one "off" position, the "off" conductor 328 of the cable 209 being connected to that contact member 302 in the switch 294 which corresponds in position to one of the channels which are not used in the area in which the television receiver is to be located. Thus, for example, if channel 3 is one channel which is not employed in this area, the "off" conductor 328 and the conductor to the receiver 22 are connected to that contact member 302 which is disconnected from the ring 318 when the tuner is positioned so as to receive channel 3. Therefore, when the arm 200 of the selector switch 199 is so positioned as to connect the tuner motor 286 through the switches 334, 265 and 222 to the on-off contact member 302, the tuner motor 286 will be energized through the conductive ring 318 of the tuner rotor 308 until the notch 318a is positioned directly opposite the "off" contact member 302. At this time power energization to the tuner motor 286 will be interrupted and the motor will stop with the "off" contact member 302 resting on the insulator portion 314 of the rotor 308. Therefore, the energization circuit to the television receiver 222 is also interrupted and the set is effectively turned off. If, however, the selector switch 199 is repositioned as hereinbefore described such that a different channel such, for example, as channel 7 is energized, then the tuner motor will be energized through the particular conductor in the cable 209 associated with the channel 7 contact button of the selector switch 199 and the motor 286 will rotate the shaft 291 until the recess 318a is opposite the channel 7 contact member 302. At this time the energization circuit of the motor 286 will be interrupted and the motor will stop with the contact member 302 disconnected from the power line 282. The tuner motor 286 will not again rotate until a different one of the contact buttons 210 on the selector switch 199 is energized.

As hereinbefore described every fifteen minutes a new selection is made and one of the contact buttons 210 are energized unless the particular selector pin 120 involved is in a cleared position. If the particular pin 120 is in the cleared position, the contact arm 200 will be disconnected from all of the active contact buttons 210 and since no energization is coupled to the tuner motor 286 at the time the impulse switch 222 is closed, during the next fifteen minute interval the television tuner shaft will remain in the same position.

There is thus provided a television program selector which is attractive in appearance, reliable in operation and relatively simple in construction. Since information need only be recorded on the memory mechanism 81 for those instances at which it is desired to reposition the television tuner shaft or turn off the receiver, a minimum of time is required to initially set up the selector so that thereafter the various channels and programs will automatically be tuned in at the proper times.

While this invention has been described by means of a particular embodiment thereof, it will be understood that many changes and modifications may be made by those skilled in the art without departing from the true spirit and scope of this invention. Therefore, in the appended claims it is intended to cover all such changes and modifications which are truly within the invention.

What is claimed as new and desired to be secured by Letters Patent of the United States is:

1. In apparatus of the type described, the combination of a motor, a support disk adapted to be rotated by said motor and provided with a plurality of spaced apertures arranged near the outer periphery thereof, a plurality of pins respectively arranged in each of said apertures, spring bias means for urging said pins along the respective longitudinal axes thereof, means for holding each of said pins against the force of said bias means in any one of a plurality of selectable positions, and means for manually setting selected ones of said pins at selected ones of said selectable positions along the longitudinal axes thereof.

2. In apparatus of the type described, the combination of a motor means, a support disk adapted to be rotated by said motor means and provided with a plurality of spaced holders arranged near the outer periphery thereof, a plurality of pins arranged respectively in each of said holders, spring bias means for urging said pins in a common general direction along the respective longitudinal exes thereof, detent means for retaining each of said pins in any one of a plurality of selectable positions in opposition to the force of said bias means, and means for setting selected ones of said pins at a selected one of said selectable position along the longitudinal axes thereof.

3. In apparatus of the type described, the combination of a time selector means, a channel selector means, a memory means comprising a rotatably mounted disk, motor means for rotating said disk, a plurality of selector pins supported by said disk in parallel relation with the principal axes thereof, said pins being arranged in equally spaced apertures in said disk near the periphery thereof, a stop member at one end of each of said pins for coaction with the wall of said disk about the respective apertures therein, spring bias means for urging said stop member on said pins against said disk, and a plurality of spring means for holding respective ones of said pins in any one of a plurality of fixed axial positions in opposition to the bias force exerted thereof by said spring bias means.

4. In apparatus of the type described, the combination of motor means, a member adapted to be manually rotated, a circular disk adapted to be rotated about the principal axis thereof by said motor means, said disk being provided with a notch in the periphery thereof, said notch having the edges thereof tapered, a generally circular rotatable member rotatably attached to said member, and resilient means for urging said rotatable member into said notch whereby said disk is normally rotated by said motor means but is disengaged therefrom when rotated independently of said motor means.

5. A television program selector comprising means for selecting a television channel in response to an electrical signal supplied thereto, signal means for supplying said electric signal to said first named means, said signal means being adapted to be responsive to the relative position of one of a plurality of channel selector members, motor means for individually and successively selecting each of said channel selector members for actuation of said signal means, manually operated means for selecting any one of said channel selector means independently of said motor means, and switch means actuated in response to the manual operation of said manually operated means for automatically rendering said signal means inoperative when said manually operated means is utilized to select one of said selector means independently of said motor means.

6. In apparatus of the type described, the combination of motor means, memory means, clutch means responsive to said motor means for driving said memory means in synchronism with said motor means, signal means responsive to said memory means, and switch means operated by said clutch means for rendering said signal means inoperative whenever said memory means is out of synchronism with said motor means.

7. In apparatus of the type described, the combination of motor means, memory means adapted to be driven by said motor means, means enabling manual positioning of said memory means independently of said motor means, means responsive to said memory means for effecting a control function, and means for rendering said last-named means inoperative only during the period that said memory means is positioned by said third named means.

References Cited in the file of this patent

UNITED STATES PATENTS

| | | |
|---|---|---|
| 2,068,227 | Cutler et al. | Jan. 19, 1937 |
| 2,240,498 | Elliott | May 6, 1941 |
| 2,633,913 | Morrow et al. | Apr. 7, 1953 |